Patented Nov. 25, 1930

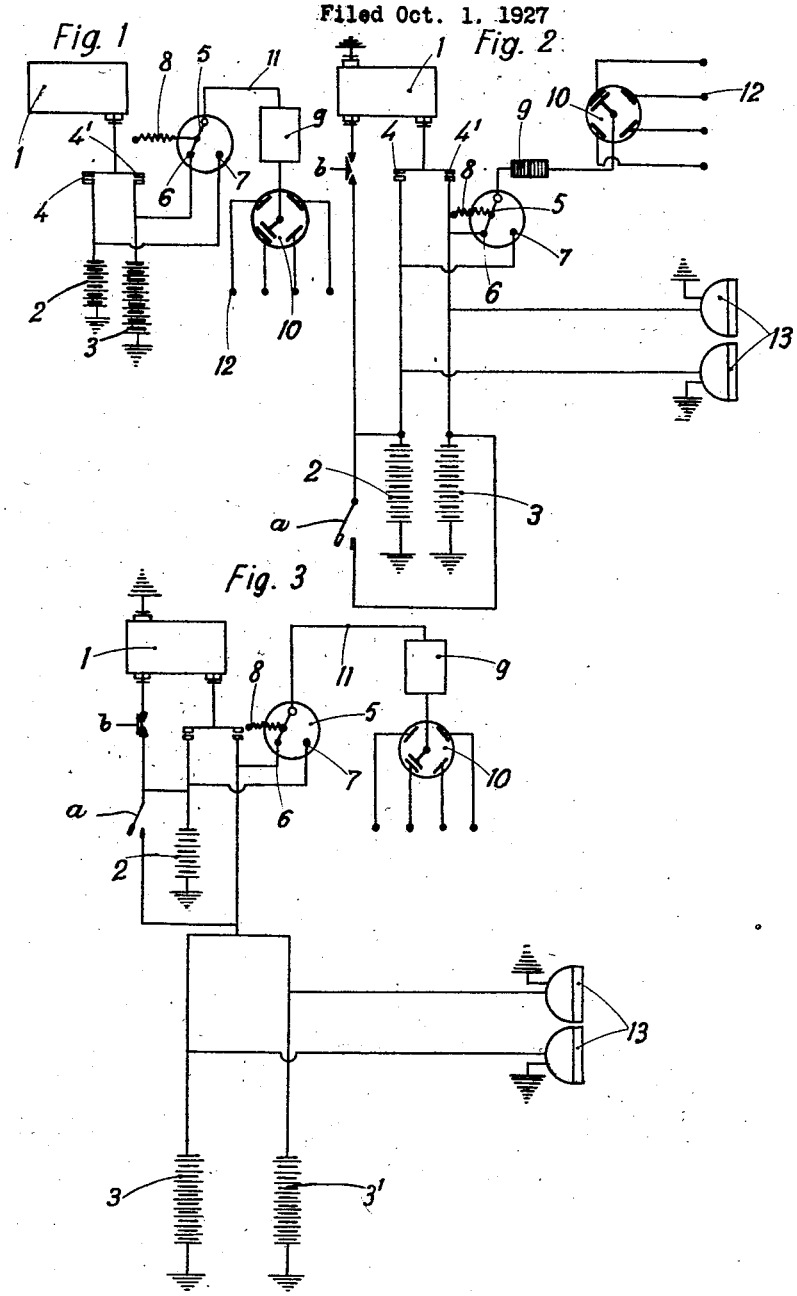

1,782,940

UNITED STATES PATENT OFFICE

LEON SAIVES, OF BILLANCOURT, FRANCE, ASSIGNOR TO LOUIS RENAULT, OF BILLANCOURT, FRANCE

APPARATUS FOR IGNITING INTERNAL-COMBUSTION ENGINES

Application filed October 1, 1927, Serial No. 223,461, and in France October 13, 1926.

My present invention relates to improvements in apparatus for igniting internal combustion engines by means of a battery, whereby the igniting of the engine is still secured in the event of the battery becoming discharged, owing to the negligence of a driver, who might have forgotten to interrupt the circuit when the engine was not running.

In the igniting apparatus according to the invention there is provided in parallel with the main battery another auxiliary battery of any type, but preferably alkaline, connected with the generator like the main battery, but independently thereof, by means of a double circuit-breaker, which will prevent the discharge of one battery through the other when the motor is not running, combined with a two-way switch permitting of supplying the igniting circuit from one or other of the two batteries.

The two-way switch preferably comprises a resetting device, always returning the switch to the position corresponding to the igniting by the normal battery. In this way the auxiliary alkaline battery will always be in working condition so as to ensure the igniting of the engine in the event of the main battery becoming discharged.

The switch might equally well be connected with the electric starting pedal of the engine, so that during the starting of the engine, in the event of considerable drop in the voltage of the battery, the igniting would be assured by the auxiliary battery and subsequently by the main battery as soon as the engine is started.

The invention thus consists substantially in connecting with the igniting apparatus two batteries, one for the normal service of the vehicle (igniting, lighting and starting), the other, called auxiliary, enabling a start to be made even in the event of the main battery having become completely discharged, in combination with a double circuit-breaker securing their independence when the engine is not running; and a two-way switch, which is normally in position for igniting from the main battery and which may be shifted manually to connect the auxiliary battery in the ignition circuit. The double circuit breaker 4, 4' permits the auxiliary battery to remain loaded when the engine is stopped, while the other battery or batteries may become discharged, as for example, when such other battery or batteries are used for lighting.

The subject of my invention will be more readily understood by referring to the accompanying drawings in which there are shown three diagrams of different connections of the apparatus.

In Fig. 1, 1 is the generator supplying the two batteries 2 and 3, 2 being the auxiliary battery and 3 the normal battery. A double circuit-breaker 4, 4' provides the connection of the batteries with the generator, independently of each other, 5 is the two-way switch comprising a contact 6 connected with the normal battery 3 and a contact 7 connected with the auxiliary battery 2; a spring 8 constantly brings back the switch-blade on to the contact 6 corresponding to igniting by the normal battery. The current passes from the switch 5 to the coil 9 and thence to sparking plugs 12 by way of the distributor 10. Switches $a$ and $b$ are provided, in a circuit adapted to connect the battery 2 with the battery 3, in the structure shown in Fig. 2, c with the batteries 3 and 3', in the structure shown in Fig. 3, in order to start the engine. Switch $a$ connects the battery 2 with the battery 3, and $b$ connects the coupled batteries 2 and 3 with the generator 1.

In the apparatus shown in Fig. 2, the batteries 2 and 3 are of the same kind and have the same capacity; each of them can supply current to one of the headlights 13 of the vehicle, as described in my French patent; they are coupled up at the desired time by the starting of the engine.

An intermediate position corresponding to the cessation of the lighting may be provided between the two contacts 6 and 7 of the switch. If the driver forgets to shift to this position and lets the battery 3 discharge through 6, then as soon as he notices the falling off of voltage of the battery 3, he has only to shift over on to the contact 7 corresponding to the battery 2, the circuit of which is open.

But in this case of two batteries, each securing half of the lighting, and coupled for the starting of the engine, it will be preferable to provide a third auxiliary battery, the switch 5 being able to remain on the so-called auxiliary contact only in the event of the complete discharge of the two normal batteries and by means of a key or plug inserted at the moment of starting. The interruption of the lighting will be obtained preferably by opening the circuit 11 by means of the general switch board in the usual way, and the lighting up on starting being obtained as in the first case by means of the starting pedal connected with the switch 5.

Fig. 3 corresponding to this arrangement shows the combination of two normal batteries 3 and 3' each supplying current to one headlight and coupled for starting with an auxiliary battery 2.

Claims:

1. An ignition system for internal combustion engines comprising an electric generator, a main battery and an auxiliary battery included in separate circuits with said generator, a double circuit breaker controlling said circuits, and a two-way switch adapted to connect the batteries selectively with the ignition apparatus.

2. An ignition system for internal combustion engines comprising an electric generator, a main battery and an auxiliary battery included in separate circuits with said generator, a double circuit breaker controlling said circuits, and a two-way switch adapted to connect the batteries selectively with the ignition apparatus, said switch having means to normally cause the same to close the circuit from the main battery to the ignition apparatus.

In testimony whereof I affix my signature.

LEON SAIVES.